May 15, 1962 J. E. THORNTON ET AL 3,035,182

DIODE TRANSFER CIRCUIT

Filed Nov. 19, 1956 2 Sheets-Sheet 1

INVENTORS

JAMES E. THORNTON

SEYMOUR R. CRAY

BY Cushman, Darby & Cushman

ATTORNEYS

May 15, 1962 J. E. THORNTON ET AL 3,035,182
DIODE TRANSFER CIRCUIT
Filed Nov. 19, 1956 2 Sheets-Sheet 2

INVENTORS
JAMES E. THORNTON
SEYMOUR R. CRAY
BY Cushman, Darby & Cushman
ATTORNEYS 3,035,182
DIODE TRANSFER CIRCUIT
James E. Thornton, St. Paul, and Seymour R. Cray, Minneapolis, Minn., assignors to Sperry Rand Corporation, New York, N.Y., a corporation of Delaware
Filed Nov. 19, 1956, Ser. No. 623,040
9 Claims. (Cl. 307—88.5)

This invention relates generally to electrical impulse circuits and more specifically to a network for detecting electrical impulses from magnetic core circuits and transferring same to other electrical circuits.

The value of small cores of magnetic material for use as storage and logical elements in electronic data handling systems is being increasingly recognized, particularly because of their miniature size, low power requirements, dependability, and ability to retain stored information for long periods of time in spite of power failure. These magnetic elements are able to store binary information in the form of static residual magnetization after being even momentarily magnetized to saturation in either of two directions. The saturation can be achieved by passing a current pulse through a winding on the magnetic element. Switching is accomplished by applying a current impulse to a winding on a core to provide a surge of magnetomotive force (M.M.F.) in the sense opposite to the pre-existing flux direction, thereby driving the element toward saturation in the opposite polarity. In so doing, a voltage impulse is induced in all windings on the core. On the other hand, an electrical impulse applied which drives the small core further into saturation in pre-existing flux direction produces a change in flux which is small compared to that created in reversing its polarity and hence induce a voltage in its windings that is much smaller than the above described induced voltage. This latter signal is commonly termed a "zero signal."

In data processing equipments utilizing magnetic cores it is necessary that the magnetic circuits communicate with peripheral equipments which may be electro-mechanical in nature. In so doing it is convenient to utilize transistor or vacuum tube circuits to amplify the electrical signals to an amplitude palatable to said electro-mechanical devices. Also, magnetic core circuits may be required to communicate with equipments consisting entirely of transistor or vacuum tube circuits. In so communicating, the zero signal generated by the magnetic core circuits has a finite voltage-time integral sufficient to cause an unwanted response in many transistor or vacuum tube circuits. The same problem may also exist in some magnetic core type utilization circuits. This invention solves the problem regardless of the type utilization device by either eliminating or reducing the zero signal in amplitude to a tolerable noise level.

Accordingly it is a primary object of this invention to provide an improved electrical network for transferring electrical impulses from magnetic core circuits to a utilization device.

It is another object of this invention to provide an improved electrical network which suppresses the zero signals from magnetic core circuits.

Still other objects of this invention will become apparent to those of ordinary skill in the art by reference to the following detailed description of the exemplary embodiments of the apparatus and the appended claims. The various features of the exemplary embodiments according to the invention may be best understood with reference to the accompanying drawings, wherein:

Figure 1:
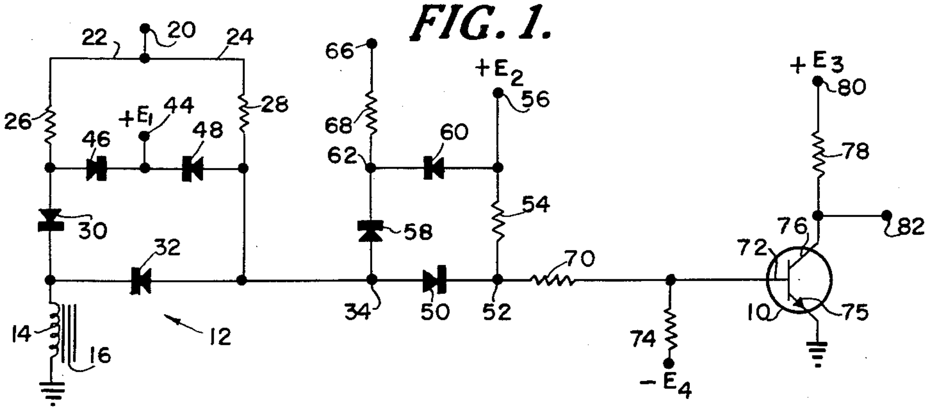
FIGURE 1 illustrates a specific embodiment of this invention.

FIGURE 1 represents a specific embodiment of the invention in that the utilization means includes a transistor 10 and its associated circuitry, and in that the magnetic core interrogating circuit 12 is of the type wherein the winding 14 of a saturable magnetic core 16 in effect is coupled to receive two separate interrogating signals. A magnetic core circuit of the type here illustrated is fully disclosed and claimed in the copending application of Seymour R. Cray, filed November 19, 1956, Serial No. 623,039, entitled "Magnetic Core Circuits," now Patent No. 2,936,743. As explained therein, the two interrogating signals which may reach winding 14, may be produced from the same source. In the circuit of FIGURE 1, a square wave signal, such as pulse 18 illustrated in line *a* of FIGURE 2, which pulse moves from a negative potential to a positive potential above zero volts or ground, when applied to terminal 20 divides between paths 22 and 24 including resistors 26 and 28 respectively. The current through resistor 26 proceeds through diode 30 and to ground through winding 14. If winding 14 presents a high impedance to the current in path 22 as a result of core 16 being in a remanence state arbitrarily called positive magnetization or a binary "1" state, a voltage will be induced across winding 14. Current in path 24 as it proceeds through resistor 28 originally tends to go through diode 32 and thence through winding 14 to ground. However, when a voltage is induced across winding 14, diode 32 is made nonconductive so that the current in path 24 cannot pass therethrough. This current is then totally buffed or diverted as a pulse to junction 34. Such a pulse is represented by the dotted waveform 36 in line *c* of FIGURE 2.

When core 16 is in the opposite state, i.e., in its negative remanence condition referred to as its "0" state, winding 14 presents very little impedance to the first interrogating signal arriving through diode 30 as well as to the second interrogating signal arriving simultaneously through diode 32. However, both signals tend to drive the core from remanent magnetization into saturation so that a small voltage is produced across winding 14. This small voltage is sufficient to block conduction through diode 32 and the current in path 24 is again buffed and diverted through junction 34 to produce a pulse such as the larger solid line pulse 38 in line *c* of FIGURE 2. If separate sources are used for the currents on paths 22 and 24 in the manner explained in the above mentioned application so that the current in path 24 begins at a time later than the current in path 22, the additional current in path 24 will cause a second small voltage such as pulse 40 to occur across winding 14 after pulse 38 has ended. With the currents in paths 22 and 24 being supplied from the same source and presented at the same time, the same second pulse effect may also be noted.

Since the voltage-time integral for switching core 16 from one state to another state is a constant, the reduction of the switching voltage will increase the time necessary for switching. Therefore the output pulse 36 may be increased in time but reduced in voltage to the form shown in dotted line 42 in line *c* of FIGURE 2 by clamping the voltages produced by the currents in paths 22 and 24 to a positive $E_1$ voltage connected to terminal 44 through diodes 46 and 48, respectively. As will be noted in line *c* of FIGURE 2, voltage $E_1$ is larger than the maximum value of the larger "0" signal 38. However, the difference between the amplitude of the output signal 42 and of the "0" output signal 38 is not so great that ambiguity cannot be produced thereby. That is, in order to have the advantage of a longer "1" output signal, the amplitude thereof must be reduced. In this manner the amplitudes of the "0" and "1" signals are so nearly equal that it becomes difficult for some utilization devices to distinguish between the two signals. Additionally, other utilization devices are so sensitive that even the smaller "0" signal 40, as well as the "0" signal 38 will undesirably operate the utilization device. Therefore, it becomes highly desirably to reduce the amplitudes of the "0" signals 38 and 40, preferably to zero.

Reduction of the "0" signals may be produced by the circuit associated with unidirectional current conducting devices such as diode 50 connected between junctions 34 and 52. The negative or cathode end of diode 50 is connected through junction 52 and resistor 54 to a steady positive potential $E_2$ at terminal 56. The positive or anode end of diode 50 is connected through diodes 58 and 60 to terminal 56, with diodes 58 and 60 being joined at their negative or cathode ends to junction 62. A declamping or transfer pulse, such as pulse 64 shown in line *b* of FIGURE 2, connected to terminal 66 is coupled to junction 62 by resistor 68. From junction 52 the output from diode 50 is coupled to transistor 10 through a resistor 70 with the base electrode 72 of the transistor being biased to a negative potential $E_4$ through resistor 74. The emitter electrode 75 is connected to ground while the collector electrode 76 is coupled through resistor 78 to a positive voltage $E_3$ at terminal 80. The output of transistor 10 may be noted at terminal 82 which is connected to the collector electrode 76.

In operation, the utilization device of FIGURE 1 including transistor 10 and its associated circuitry is such that no conduction from terminal 80 to ground takes place through the transistor while its base electrode 72 is negatively biased by voltage $-E_4$, unless there is received from junction 52 an output which will raise the voltage of base electrode 72 sufficiently to allow conduction through the transistor.

Figure 2:
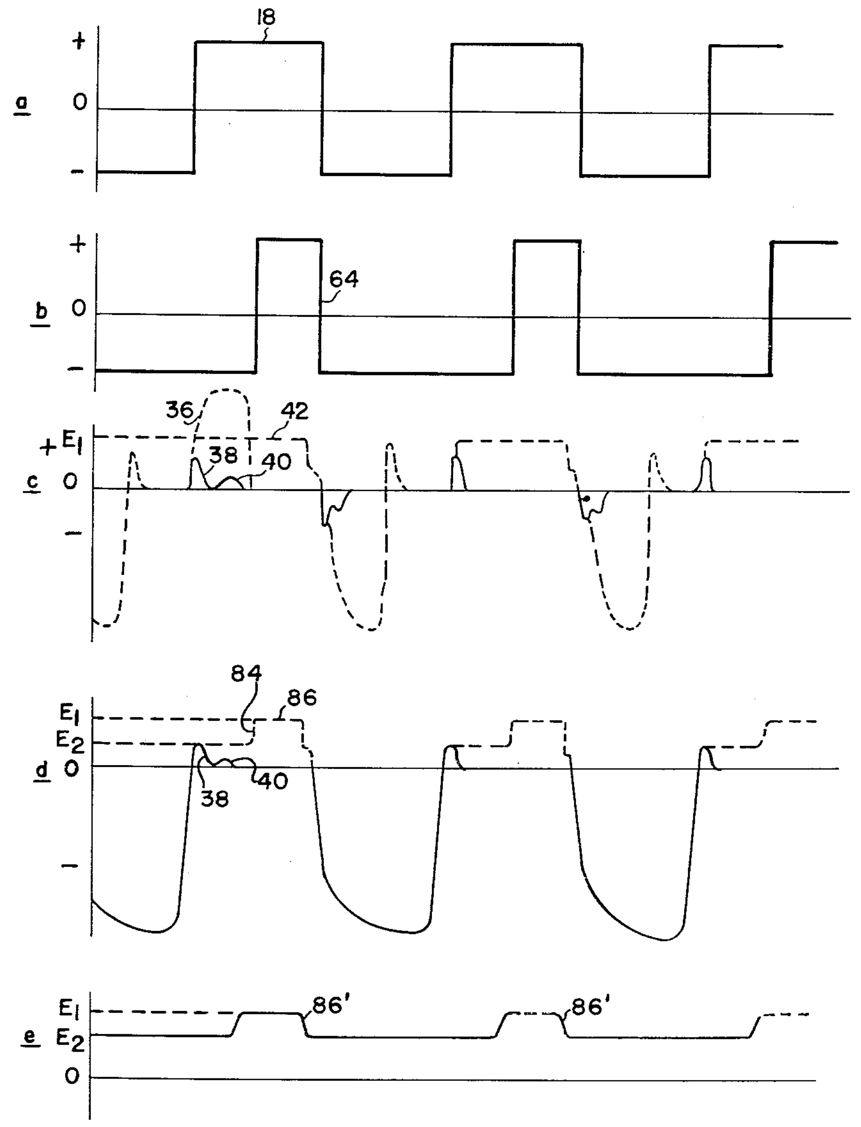
FIGURE 2 illustrates waveforms associated with the circuit shown in FIGURE 1.

As previously noted, "0" signals 38 and 40 of FIGURE 2 may be sufficient to cause conduction through transistor 10, and it is therefore desirable to reduce such signals before they reach junction 52.

Before explaining how the "0" signals are reduced to ineffectiveness, the operation of the circuitry when a "1" output, such as pulse 42, is received at junction 34 will be considered. Since voltage $E_2$ is less than the clamping voltage $E_1$, the "1" signal will be reduced to voltage $E_2$ since diode 58 as connected through diode 60 to voltage $E_2$ forms a clamping circuit. Little, if any, current from the "1" signal passes through diode 50 since junction 52 is coupled to voltage $E_2$, the voltage drop across resistor 54 being similar to the voltage drop across diode 60. However, upon receipt of a transfer or declamping pulse 64 at terminal 66, diodes 58 and 60 become completely nonconductive so that the "1" signal at junction 34 can only proceed through diode 50, and will so proceed because junction 34, when diode 58 is made non-conductive, raises in potential to the amplitude of the "1" signal, while junction 52 remains nearer voltage $E_2$, thereby effectively removing the bias across diode 50. With reference to line *d* of FIGURE 2, it will be noted that the voltage at junction 52 follows the dotted line 84 during the time of pulse 42. The raised portion 86 of the dotted line 84 occurs only when the declamping pulse 64 is operative to make diodes 58 and 60 non-conductive. Line *e* of FIGURE 2 illustrates the voltage at junction 52 during several periods of drive pulses 18 and transfer or declamping pulses 64 with the pulses 86 being the same as the raised portion 86 of waveform 84 in line *d* of FIGURE 2.

When the output from the magnetic core provides a "0" signal at junction 34, and such signal contains two pulses 38, 40, again very little, if any, current will flow through diode 50 because of the clamping action effective to reduce the voltage at junction 34 to a voltage $E_2$. Although the amplitude of the "0" output signal is less than voltage $E_2$, it will be apparent that $E_2$ could be slightly smaller than the "0" amplitude. By reference to FIGURE 2, lines *b* and *d*, it will be noted that the transfer pulse 64 is not applied until after both of the "0" signal pulses 38, 40 have subsided. When the "0" signals subside, both diodes 50 and 58 are cut off by bias voltage $E_2$. The main function of diode 60 is to keep diode 58 non-conductive as to current from resistor 28 after the "0" signals subside and before transfer pulse 64 goes positive. This prevents another positive impulse from appearing at the output when the transfer pulse goes positive. That is, if diode 58 were not cut off but were conducting heavily after pulse 40 subsides and before transfer pulse 64 begins, diode 32 would be partially or wholly cut off. Then, upon pulse 64 becoming positive, the current through resistance 28 would be switched through diode 32, thence through winding 14. This would drive core 16 further into saturation resulting in another "0" signal which might be sufficient to cause a response in transistor 10. However, in accordance with this invention, diode 58 is completely cut off except when a "1" signal appears at junction 34 so that all of the current from resistor 28 after the subsiding of "0" signals 38, 40 passes through diode 32. Therefore, upon presentation of the declamping pulse 64, no additional current will pass through winding 14 to drive core 16 further into saturation. Additional "0" signals will not then be present at junction 34 and will consequently not appear at the output to effect the operation of transistor 10.

Figure 3:
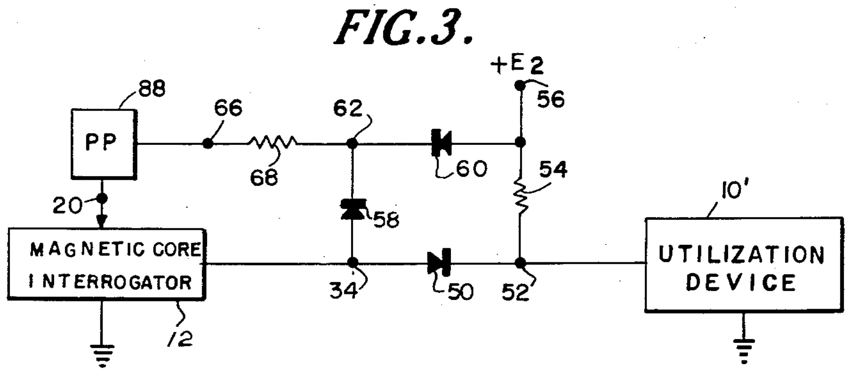
FIGURE 3 illustrates a generalized embodiment of this invention for transferring electrical impulses to a transistor circuit.
Figure 4:
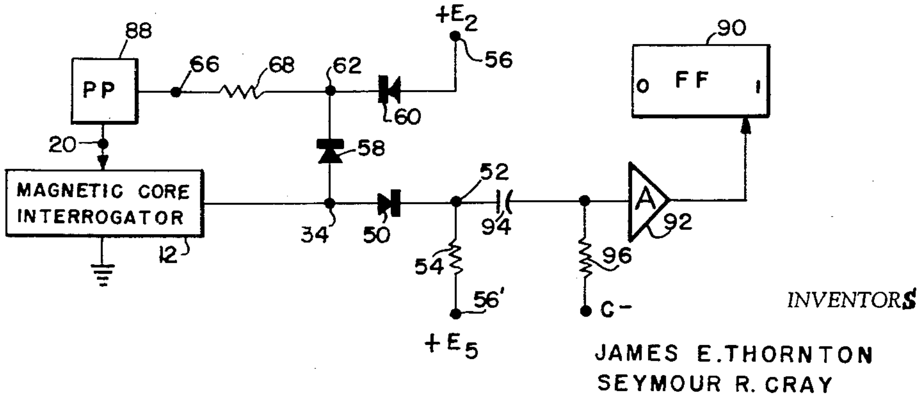
FIGURE 4 illustrates a modification of this invention wherein electrical impulses are transferred to a vacuum tube circuit.

This invention is not limited to the particular magnetic core circuitry illustrated in FIGURE 1 but it is intended to encompass any magnetic core interrogating circuitry which provides a "0" signal whether such has one or two pulses, and a "1" signal regardless of its amplitude or duration as long as its duration is greater than that of the "0" signals associated with the particular core circuit. The general embodiment of the invention is illustrated in FIGURE 3 wherein the utilization device 10' shown diagrammatically may be, for example, a transistor, vacuum tube circuit, or any other type device sensitive to the input thereto. The power pulses PP for producing the drive pulse connectable to terminal 20 and the declamping or transfer pulse connectable to terminal 66 may be produced from a power pulse source 88 with the timing of the respective pulses being similar to that illustrated in lines *a* and *b* of FIGURE 2. The output of the magnetic core terminal 56', instead of resistor 54 being connected directly to voltage $E_2$ at terminal 56. It is therefore apparent that the cathode bias of diode 50 at junction 52 need not be produced by the limiting voltage $E_2$. That is, voltage $E_5$ may be different than voltage $E_2$ and when higher, will in effect reduce the amplitude of the output pulses 86 of line *e* in FIGURE 2, since a larger input to junction 34 is necessary to overcome the bias to terminal 52.

Thus it is apparent that there is provided by this invention systems in which the various phases, objects, and advantages herein set forth are successfully achieved.

Modifications of this invention not described herein will become apparent to those of ordinary skill in the art. Therefore, it is intended that the matter contained in the foregoing description and the accompanying drawings be interpreted as illustrative and not limitative, the scope of the invention being defined in the appended claims.

What is claimed is:

1. In apparatus for detecting the state of a bistable magnetic core element by a predetermined circuit coupled thereto whereby a first signal is provided to the output of said circuit when said element is shifted upon being interrogated and a second signal including at least one pulse is provided to said output when the element is not so shifted during interrogation, the first signal having a substantially greater duration and voltage-time integral than said second signal, the improvement comprising unidirectional conducting means coupled in series with said output but only in a forward direction relative to said first and second signals, means coupling a predetermined potential to only the output side of said unidirectional means for reverse biasing said unidirectional means, means coupled to the input side of said unidirectional means for limiting said first and second signals to a maximum potential lower than that of said first signal and at least substantially similar to said predetermined potential whereby said first and second signals are at least substantially prevented from passing through said unidirectional means, and means for effectively removing said limiting means at a predetermined time beyond the time that is required for said second signal to reach maximum amplitude, the arrangement being such that the output signal has an amplitude equal to the difference in amplitudes of the first signal and said predetermined potential.

2. Apparatus as in claim 1 wherein said predetermined potential and said limiting potential are from the same source, the means coupling said predetermined potential and the potential limiting means being connected in parallel to said source and across said unidirectional means.

3. Apparatus for transferring information from a bistable magnetic core circuit to utilization means sensitive not only to a first signal provided from the output of said magnetic core circuit when said element is shifted upon being interrogated, but also to a second signal including at least one pulse provided to said output when the element is not so shifted during interrogation, the first signal having a substantially greater duration and voltage-time integral than said second signal, comprising said magnetic core circuit operative to provide said first and second signals as aforesaid, said utilization means, sensitive to said first and second signals as aforesaid, and means between said circuit and utilization means for effectively blocking said second signal from the utilization means comprising conducting means coupled only forwardly relative to said first and second signals and in series with the output of said magnetic core circuit, means coupling a predetermined potential to the unidirectional means for biasing same substantially to nonconduction at least in absence of said first and second signals, means coupled between the core circuit and unidirectional means for reducing the amplitude of at least said first signal, said first and second signals being thereby effectively prevented from passing through said unidirectional means, and means for effectively removing the amplitude reducing means at a predetermined time beyond the time when said second signal reaches maximum amplitude but before the ending time of the said first signal, the arrangement being such that the utilization means receives an input signal as a result only of said first signal, said input signal having an amplitude of substantially the difference between the amplitudes of said first signal and said predetermined potential.

4. Apparatus as in claim 3 wherein said magnetic core circuit includes clamping means whereby the amplitude of said first signal is limited to a predetermined value and causing the duration thereof to be increased, said predetermined value being larger than the maximum amplitude of said second signal, and wherein the means for reducing the amplitude of said first signal lowers the maximum amplitude thereof to a value below said predetermined value.

5. Apparatus as in claim 3 wherein said magnetic circuit provides a second pulse in said second signal and said predetermined time substantially encompasses both of the pulses in said second signal, the arrangement being such that neither of said pulses provide any effective input signal to the utilization means.

6. Apparatus as in claim 3 wherein said unidirectional conducting means is a diode coupled to said predetermined potential by a resistor, and wherein the first signal amplitude reducing means includes a second diode coupled to the first mentioned diode at the opposite side thereof as said resistor and a third diode coupled in opposition to said second diode and to said predetermined potential, and wherein the means for effectively removing the amplitude reducing means includes means coupling a transfer signal to a point between said second and third diodes whereby conduction through said second and third diodes is prevented, the arrangement being such that in absence of said transfer signal, said first and second signals are limited in amplitude to said predetermined potential and substantially prevented from passing the first mentioned diode, while the presence of said transfer pulse blocks conduction through said second and third diodes and allows passage of said first signal through the first mentioned diode to the extent that said first signal exceeds in amplitude the amplitude of said predetermined potential, said transfer signal beginning only at said predetermined time.

7. Apparatus comprising unidirectional conducting means having input and output ends, means for coupling a constant potential to the output end of said unidirectional means for reverse biasing said unidirectional means, means for mutually exclusively applying to the input end of said unidirectional means a first signal of given polarity and duration and a second signal of the same polarity but of shorter duration with at least said first signal having an amplitude greater than the reverse bias effected as aforesaid at the said output end of said unidirectional means, said unidirectional means being disposed in a forward direction relative to said signals, and means coupled to the said unidirectional means input end and operative when either of said signals is applied to said input end to reduce the amplitude of the applied signal to a predetermined potential if the applied signal amplitude is greater than said predetermined potential and operative at a predetermined time after one of said signals is applied which time is less than the duration of said first signal but more than the time required for said second signal to start subsiding, to then effectively remove said predetermined potential and allow any remaining part of the applied signal which is greater in magnitude than said reverse bias to pass through said unidirectional means.

8. Apparatus as in claim 7 wherein said constant and predetermined potentials are substantially equal.

9. Apparatus as in claim 8 wherein the constant potential coupling means causes the said reverse bias to be less in magnitude than said constant potential.

References Cited in the file of this patent

UNITED STATES PATENTS

| | | |
|---|---|---|
| 2,618,753 | Van Mierlo | Nov. 18, 1952 |
| 2,683,819 | Rey | July 13, 1954 |
| 2,716,156 | Harris | Aug. 23, 1954 |
| 2,748,269 | Slutz | May 29, 1956 |
| 2,782,307 | Von Sivers et al. | Feb. 19, 1957 |
| 2,841,719 | Radcliffe | July 1, 1958 |
| 2,866,178 | Lo et al. | Dec. 23, 1958 |

FOREIGN PATENTS

| | | |
|---|---|---|
| 748,558 | Great Britain | May 2, 1956 |